United States Patent [19]
Kohli

[11] Patent Number: 5,854,153
[45] Date of Patent: Dec. 29, 1998

[54] GLASSES FOR DISPLAY PANELS

[75] Inventor: Jeffrey T. Kohli, Corning, N.Y.

[73] Assignee: Corning Incorporated, Corning, N.Y.

[21] Appl. No.: 992,403

[22] Filed: Dec. 17, 1997

Related U.S. Application Data

[60] Provisional application No. 60/035,171 Jan. 9, 1997.

[51] Int. Cl.⁶ .......................... C03C 3/087; C03C 3/091; C03C 3/093
[52] U.S. Cl. ................. 501/70; 501/56; 501/59; 501/63; 501/64; 501/66; 501/67; 501/69; 345/60
[58] Field of Search .................. 501/56, 59, 63, 501/64, 66, 67, 70, 69; 345/60

[56] References Cited

U.S. PATENT DOCUMENTS

| | | | |
|---|---|---|---|
| 3,445,255 | 5/1969 | Monks, Jr. ................................ | 106/52 |
| 3,900,329 | 8/1975 | Grubb et al. ............................ | 106/52 |
| 5,559,060 | 9/1996 | Dumbaugh, Jr. et al. ................ | 501/70 |
| 5,599,754 | 2/1997 | Maeda et al. ............................ | 501/70 |
| 5,631,195 | 5/1997 | Yanagisawa et al. .................... | 501/70 |
| 5,780,371 | 7/1998 | Rifqi et al. .............................. | 501/67 |

FOREIGN PATENT DOCUMENTS

| | | |
|---|---|---|
| 96/11887 | 4/1996 | European Pat. Off. . |
| 0 795 522 A1 | 9/1997 | European Pat. Off. . |
| 3-040933 | 2/1991 | Japan . |
| 7-257937 | 10/1995 | Japan . |
| 8-165138 | 6/1996 | Japan . |
| 9-202641 | 8/1997 | Japan . |
| 96/11888 | 4/1996 | WIPO . |

*Primary Examiner*—Michael Marcheschi
*Attorney, Agent, or Firm*—Robert L. Carlson; Scott S. Servilla

[57] ABSTRACT

Glasses for use as substrates for flat panel displays, having a composition consisting essentially of, as calculated in weight percent on an oxide basis, of 42–62 $SiO_2$, 15–28 $Al_2O_3$, 0–4 $B_2O_3$, 3–10 $Na_2O$, 2–12 $K_2O$, 0–6 MgO, 9.5–24 CaO, 0–8 SrO, 0–16 BaO, 0–4 $ZrO_2$ and 4–16 $Li_2O+Na_2O+K_2O$.

24 Claims, No Drawings

GLASSES FOR DISPLAY PANELS

This application claims the benefit of U.S. Provisional Application No. 60/035,171, filed Jan. 9, 1997.

FIELD OF THE INVENTION

The invention relates to a family of aluminosilicate glass compositions exhibiting physical and chemical properties suitable for use in flat panel displays, in particular plasma display panels (PDPs).

BACKGROUND OF THE INVENTION

There is a rapidly growing interest in flat panel display devices. Thus far, commercial activity has centered on small units such as those used in laptop computers. For this purpose, the liquid crystal display (LCD) device has been the dominant product.

Increasing attention is being given to larger units that may be used in information and entertainment applications. LCDs tend to require critical accuracy in construction and, therefore, do not readily lend themselves to large size screens. Accordingly, as interest shifts to larger size units, attention is being directed to alternative types of display devices. One such alternative is a plasma display device. In its simplest form, a plasma display device embodies two insulating glass substrates maintained in opposed, spaced relationship. One substrate has anode electrodes formed on its interface. The other substrate has cathode electrodes formed on its interface. The electrodes may be applied in stripes that are perpendicular to one another. They may be printed, or may be formed by a photolithographic process. Barriers are formed between the electrodes in each set to prevent cross talk.

The substrates are maintained in a fixed relationship facing each other. A rare gas, such as neon, argon, or helium is enclosed around and between the electrodes. When a voltage, which may be up to 100 V, is applied between the electrode sets, the gas undergoes a glow discharge. This is based on a principle commonly known as the neon glow discharge principle.

The light generated by this discharge may be used to form the image on the display. The electrodes may contain materials that generate the primary red, green and blue (RGB) colors under influence of the discharge. In another form, fluorescent phosphors are coated on repeating structures and are affected by the discharge to produce the desired colors. Typically, the gas discharge generates UV light which excites the phosphors, which in turn give off RGB light in the visible region of the spectrum.

Heretofore, the insulating substrates employed in emissive display devices have been sheets of soda lime glass. Soda lime glasses have been used because they provide a relatively high coefficient of thermal expansion (CTE), thereby more closely matching the expansion of glass frits typically used in producing electrodes and barriers in a display device.

For example, the electrodes and barriers may be applied as a paste and dried or fired. The paste will contain a conductive component, such as a metal powder, a low melting point glass frit, and organics as a solvent and as a binder. The dried paste is fired to burn out any residual organic and to soften the glass frit to adhere to the substrate.

While traditional soda lime glasses have the necessary high CTEs, they also have low strain points and low resistivities. Consequently, a soda lime substrate may shrink and/or undergo distortion during thermal processing. This processing includes firing the electrodes and/or sealing the substrates together. The high soda content also leads to sodium ion migration which degrades the display electronics (e.g. electrodes).

It would, therefore, be desirable to provide a glass substrate having a CTE of $79°-88°\times10^{-7}/°$ C. over the range of $25°-300°$ C. and a strain point greater than $600°$ C. At the same time, it would be desirable for the glass to be capable of being manufactured using the float process in order to minimize manufacturing costs.

SUMMARY OF THE INVENTION

One aspect of the present invention relates to a glass having a coefficient of thermal expansion over the temperature range of $25°-300°$ C. between $60°$ and $90°\times10^{-7}/°$ C., and a strain point higher than $600°$ C., whose composition consists essentially of, as calculated in weight percent on an oxide basis, 42–62 $SiO_2$, 15–28 $Al_2O_3$, 0–4 $B_2O_3$, 3–10 $Na_2O$, 1–11 $K_2O$, 0–6 $MgO$, 9.5–24 $CaO$, 0–8 $SrO$, 0–16 $BaO$, 0–4 $ZrO_2$ and 4–16 $Li_2O+Na_2O+K_2O$.

The present glasses employ 42–62% by weight $SiO_2$ as the primary glass former. Increasing $SiO_2$ content generally improves durability, but raises the melting and forming temperatures. The glasses also comprise 15–28% $Al_2O_3$. As the $Al_2O_3$ content increases, glass durability increases, but CTE decreases and the melting and forming temperatures increase. Consequently $Al_2O_3$ is maintained between about 15 and 28 weight percent, more preferably between about 16.5 to 27 weight percent, and most preferably between about 20 and 26 weight percent. Boric oxide ($B_2O_3$) decreases melting temperature, but is generally detrimental to durability, strain point, and CTE. Therefore, $B_2O_3$ is limited to 4%, and is most preferably essentially omitted. It is desirable to maintain the molar ratio of $Na_2O:K_2O$ at approximately 1:1 in order to limit alkali mobility (due to the mixed alkali effect). However, a molar ratio of approximately 2.5:1 is desirable to minimize the liquidus temperature. Consequently, in the present invention, it is desirable to maintain the $Na_2O:K_2O$ molar ratio at 0.8–2.7:1, more preferably 1.0–2.5:1. Alkali are used in order to maintain a high coefficient of thermal expansion (CTE). The role of MgO and CaO is to limit alkali mobility and flux the melt at relatively high temperatures, while helping to provide a high strain point, a low density and enhanced chemical durability and Young's modulus. Other ingredients may include, for example, the transition metal oxides, particularly those in period 4 (such as ZnO and $TiO_2$), as well as $Y_2O_3$, $La_2O_3$, and $P_2O_5$, and those ingredients employed for fining (e.g. $CaSO_4$, $NaSO_4$, halides, and so forth). These, and other ingredients should preferably not exceed 5 weight percent in total, and most preferably should be less than or equal to 3 weight percent in total.

The preferred glasses are those which consist essentially of (expressed in weight percent): 42–59 $SiO_2$, 16.5–27 $Al_2O_3$, 0–3 $B_2O_3$, 3–10 $Na_2O$, 2–9 $K_2O$, 0–5 MgO, 9.5–24 CaO, 0–8 SrO, 0–13 BaO, 0–3 $ZrO_2$ and 5–15 $Li_2O+Na_2O+K_2O$ and no more than 5 wt % of optional ingredients such as those listed above.

The most preferred glasses are those which consist essentially of (expressed in weight percent): 42–59 $SiO_2$, greater than 20 and less than 26 $Al_2O_3$, 0–2 $B_2O_3$, 3–9 $Na_2O$, 2–7 $K_2O$, 0–4 MgO, 10–24 CaO, 0–7 SrO, 0–8 BaO, 0–2 $ZrO_2$, 6–15 $Li_2O+Na_2O+K_2O$, and no more than 4 wt % of the optional ingredients listed above.

The preferred glasses in accordance with the present invention have a CTE in the range of $60°-90°\times10^{-7}/°$ C., more preferably 70°–90°×10$^{-7}$/° C., and most preferably 79°–88°×10$^{-7}$/° C. over the temperature range of 25°–300° C. The desire for such a CTE is primarily driven by the desire to match the CTEs of glass frits used in electrodes, barrier ribs, overcoats, sealing operations, and other materials. The glasses of the present invention preferably have a strain point greater than 615° C., more preferably greater than about 625° C., and most preferably greater than about 650° C. A high strain point is desired to help prevent panel distortion due to compaction/shrinkage or viscous flow during subsequent thermal processing. Such processing includes firing of electrodes, sealing of panels and application of coatings. In the most preferred embodiments, the glasses exhibit a combination of desirable CTE's and strain point. For example, the most preferred glasses exhibit a CTE in between 79°–88°×10$^{-7}$/° C., in combination with a strain point greater than 625° C., and most preferably greater than about 650° C. The glasses of the present invention also exhibit low density (less than 3.0 g/cm$^3$, more preferably less than 2.8 g/cm$^3$) in order to minimize display weight, relatively high resistivity (log resistivity greater than or equal to 6.5 ohm cm. at 250° C., more preferably greater than or equal to 7.0 ohm cm at 250° C.) in order to ensure extended display lifetimes. These glasses also exhibit good chemical durability and optical clarity, as well as low batch cost. As a means to optimize the market opportunity for PDP's it is desirable that the batch cost of a PDP glass composition should preferably be low, and it is believed that the most economical means of panel/substrate manufacture is the float glass process. The present invention disclosure outlines a glass compositional area which is believed to be ideally suited for substrates for plasma display panels. It is believed that many of the glasses of the present invention are capable of being formed using the float glass manufacturing process.

Additionally, the value of Al$_2$O$_3$/ZrO$_2$ should preferably not fall below 3 (calculated in wt %). Moreover, the total of Al$_2$O$_3$+ZrO$_2$ should preferably exceed 10 wt %, but not more than 28 wt %. SiO$_2$+Al$_2$O$_3$ should preferably range from 60–82 wt %, more preferably 64–76 wt %.

DETAILED DESCRIPTION OF THE INVENTION

The invention is further illustrated by the following examples, which are meant to be illustrative, and not in any way limiting, to the claimed invention. Table I records a number of glass compositions, expressed in terms of parts by weight on the oxide basis, illustrating the compositional parameters of the present invention. Inasmuch as the sum of the individual constituents totals or very closely approximates 100, for all practical purposes the reported values may be deemed to represent weight percent. The actual batch ingredients may comprise any materials, either oxides or other compounds, which, when melted together, with the other batch components, will be converted into the desired oxides in the proper proportions. For example, SrCO$_3$ and CaCO$_3$ can provide the source of SrO and CaO, respectively.

These example glasses were prepared by melting 1000–5000 gram batches of each glass composition at a temperature and time to result in a relatively homogeneous glass composition, e.g. at a temperature of about 1450°–1600° C. for a period of about 6 to 12 hours.

Table I also lists measurements of several chemical and physical properties determined on the glasses in accordance with techniques conventional in the glass art. Thus, the softening point (soft pt.), annealing point, and strain point expressed in terms of ° C., were determined by beam bending viscometry (in the case of annealing point and strain point) or parallel plate viscometry (in the case of softening point). The linear coefficient of thermal expansion (CTE) over the temperature range 25°–300° C. expressed in terms of×10$^{-7}$/° C. was measured using dilatometry. Also listed is density, in g/cm$^3$.

The liquidus temperatures of the glasses was measured via the standard liquidus method (24 hour gradient boat test), which involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass.

| | wt % | | | | |
|---|---|---|---|---|---|
| | 1 | 2 | 3 | 4 | 5 |
| SiO$_2$ | 55.9 | 57.5 | 58.6 | 56.9 | 53.9 |
| Al$_2$O$_3$ | 18.4 | 16.3 | 14.0 | 13.7 | 11.3 |
| B$_2$O$_3$ | — | — | — | — | — |
| Na$_2$O | 8.6 | 7.6 | 4.6 | 6.4 | 4.7 |
| K$_2$O | 4.9 | 4.4 | 6.9 | 3.8 | 2.7 |
| MgO | 1.6 | 1.5 | 1.5 | 0.1 | 1.1 |
| CaO | 10.6 | 12.6 | 14.4 | 13.9 | 10.4 |
| SrO | — | — | — | — | 5.2 |
| BaO | | | | 5.2 | 10.7 |
| Liquidus (°C.) Temperature | 1200 | 1130 | 1185 | 1285 | 1180 |
| Soft Pt (°C.) | 856 | 852 | 866 | 841 | 833 |
| Anneal Pt (°C.) | 652 | 657 | 677 | 653 | 644 |
| Strain Pt (°C.) | 608 | 612 | 631 | 609 | 600 |
| CTE × 10$^{-7}$/°C. | 87.5 | 85.0 | 86.2 | 83.7 | 81.3 |
| Density (g/cm$^3$) | 2.55 | 2.55 | 2.55 | 2.65 | 2.82 |

| | wt % | | | | |
|---|---|---|---|---|---|
| | 6 | 7 | 8 | 9 | 10 |
| SiO$_2$ | 57.1 | 53.6 | 56.5 | 45.3 | 45.0 |
| Al$_2$O$_3$ | 13.3 | 10.8 | 12.2 | 23.5 | 22.0 |
| Na$_2$O | 6.5 | 4.7 | 6.4 | 5.3 | 6.5 |
| K$_2$O | 3.8 | 2.7 | 3.7 | 3.1 | 3.9 |
| MgO | 1.4 | 1.1 | 1.4 | 0.1 | 0.1 |
| CaO | 11.6 | 10.4 | 11.5 | 22.7 | 22.5 |
| SrO | 1.9 | 5.1 | 1.8 | 0.0 | 0.0 |
| BaO | 4.4 | 10.6 | 4.3 | 0.0 | 0.0 |
| ZrO$_2$ | — | 1.0 | 2.2 | — | — |
| Liquidus (°C.) Temperature | 1190 | 1210 | 1240 | 1185 | 1175 |
| Soft Pt (°C.) | 834 | 837 | 847 | 879 | 858 |
| Anneal Pt (°C.) | 641 | 645 | 651 | 707 | 691 |
| Strain Pt (°C.) | 597 | 600 | 605 | 666 | 651 |
| CTE × 10$^{-7}$/°C. | 83.1 | 80.9 | 81.0 | 80.6 | 86.9 |
| Density (g/cm$^3$) | 2.65 | 2.83 | 2.68 | 2.68 | 2.68 |

| | wt % | | | | |
|---|---|---|---|---|---|
| | 11 | 12 | 13 | 14 | 15 |
| SiO$_2$ | 44.9 | 44.4 | 43.6 | 45.2 | 43.9 |
| Al$_2$O$_3$ | 20.3 | 23.2 | 22.9 | 23.7 | 24.5 |
| Na$_2$O | 7.8 | 5.1 | 5.0 | 3.4 | 4.0 |
| K$_2$O | 4.6 | 3.1 | 3.1 | 5.8 | 4.9 |
| MgO | 0.1 | 0.1 | 0.1 | 2.3 | 0.1 |
| CaO | 22.3 | 20.2 | 19.9 | 19.6 | 22.6 |
| SrO | 0.0 | 3.6 | 0.2 | 0.0 | 0.0 |
| BaO | 0.0 | 0.3 | 5.2 | 0.0 | 0.0 |
| Liquidus (°C.) Temperature | 1195 | 1115 | 1150 | 1215 | 1180 |
| Soft Pt (°C.) | 838 | 877 | 876 | 888 | 891 |
| Anneal Pt (°C.) | 671 | 703 | 699 | 708 | 718 |
| Strain Pt (°C.) | 630 | 661 | 656 | 663 | 677 |
| CTE × 10$^{-7}$/°C. | 94.1 | 81.4 | 81.0 | 78.9 | 79.2 |
| Density (g/cm$^3$) | 2.68 | 2.72 | 2.75 | 2.66 | 2.68 |

-continued

| | wt % | | |
|---|---|---|---|
| | 16 | 17 | 18 |
| SiO$_2$ | 51.9 | 47.5 | 48.1 |
| Al$_2$O$_3$ | 21.3 | 22.8 | 23.5 |
| Na$_2$O | 8.0 | 6.2 | 7.1 |
| K$_2$O | 4.8 | 3.6 | 4.3 |
| MgO | 1.8 | 0.6 | 1.2 |
| CaO | 12.2 | 19.3 | 15.8 |
| SrO | 0.0 | 0.0 | 0.0 |
| BaO | 0.0 | 0.0 | 0.0 |
| Liquidus (°C.) Temperature | 1145 | 1160 | 1140 |
| Soft Pt (°C.) | 863 | 871 | 870 |
| Anneal Pt (°C.) | 669 | 692 | 684 |
| Strain Pt (°C.) | 625 | 650 | 640 |
| CTE × 10$^{-7}$/°C. | 85.8 | 82.3 | 83.7 |
| Density (g/cm$^3$) | 2.58 | 2.65 | 2.62 |

Glasses having the compositions and properties as shown in Examples 10 and 12 are currently regarded as representing the best mode of the invention, that is, as providing the best combination of properties and manufacturability for the purposes of the invention at this time.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A glass substrate for an electronic display device, wherein said substrate is comprised of a flat, transparent glass exhibiting a linear coefficient of thermal expansion over the temperature range 25°–300° C. between 60°–90°×10$^{-7}$/° C. and a strain point higher than 615° C., said glass consisting essentially of, expressed in terms of weight percent on an oxide basis, 42–62 SiO$_2$, 16.5–28 Al$_2$O$_3$, 0–4 B$_2$O$_3$, 3–10 Na$_2$O, 1–11 K$_2$O, 0–6 MgO, 9.5–24 CaO, 0.2–8 SrO, 0–16 BaO, 0–4 ZrO$_2$, and Li$_2$O+Na$_2$O+K$_2$O in total amount of 4–16 weight percent.

2. A substrate according to claim 1, wherein said glass has a CTE of 79°–88°×10$^{-7}$/° C.

3. A substrate according to claim 2, wherein said glass has a strain point over 625° C.

4. A substrate according to claim 2, wherein B$_2$O$_3$ is essentially omitted.

5. An emissive flat panel display comprising the substrate according to claim 2.

6. A substrate according to claim 1, further consisting essentially of at least one optional component selected from the group consisting of transition metal oxides, Y$_2$O$_3$, La$_2$O$_3$, P$_2$O$_5$, sulfates, As$_2$O$_3$, Sb$_2$O$_3$, and halides, in a total amount not exceeding 5 weight percent.

7. A substrate according to claim 6, wherein said optional ingredients do not exceed 3 weight percent.

8. A substrate according to claim 2, wherein said glass consists essentially, as expressed in terms of weight percent on an oxide basis, of 42–59 SiO$_2$, 16.5–27 Al$_2$O$_3$, 0–3 B$_2$O$_3$, 3–10 Na$_2$O, 2–9 K$_2$O, 0–5 MgO, 9.5–24 CaO, 0.2–8 SrO, 0–13 BaO, 0–3 ZrO$_2$ and Li$_2$O+Na$_2$O+K$_2$O in total of 5–15 weight percent.

9. A substrate according to claim 8, wherein said glass has a CTE of 79°–85°×10$^{-7}$/° C.

10. A substrate according to claim 9, wherein said glass has a strain point over 625° C.

11. A substrate according to claim 1, wherein said glass consists essentially, as expressed in terms of weight percent on an oxide basis, of 42–59 SiO$_2$, 16.5–26 Al$_2$O$_3$, 0–2 B$_2$O$_3$, 3–9 Na$_2$O, 2–7 K$_2$O, 0–4 MgO, 9.5–24 CaO, 0.2–7 SrO, 0–8 BaO, 0–2 ZrO$_2$, and Li$_2$O+Na$_2$O+K$_2$O in total of 6–15 weight percent.

12. A glass exhibiting a linear coefficient of thermal expansion over the temperature range 25°–300° C. between 60°–90°×10$^{-7}$/° C. and a strain point higher than 600° C., said glass consisting essentially of, expressed in terms of weight percent on an oxide basis, 42–62 SiO$_2$, 16.5–28 Al$_2$O$_3$, 0–4 B$_2$O$_3$, 3–10 Na$_2$O, 1–11 K$_2$O, 0–6 MgO, 9.5–24 CaO, 0.2–8 SrO, 0–16 BaO, and 0–4 ZrO$_2$.

13. A glass according to claim 12, wherein Li$_2$O+Na$_2$O+K$_2$O are present in a total amount of between 4–16 weight percent.

14. A glass according to claim 13, wherein said glass has a CTE of 79°–88°×10$^{-7}$/° C.

15. A glass according to claim 14, wherein said glass has a strain point over 625° C.

16. A glass according to claim 14, wherein B$_2$O$_3$ is essentially omitted.

17. A glass according to claim 13 further consisting essentially of at least one optional component selected from the group consisting of transition metal oxides, Y$_2$O, La$_2$O$_3$, P$_2$O$_5$, sulfates, and halides, in a total amount not exceeding 5 weight percent.

18. A glass according to claim 17, wherein said optional ingredients do not exceed 3 weight percent.

19. A glass according to claim 13, wherein said glass consists essentially, as expressed in terms of weight percent on an oxide basis, of 42–59 SiO$_2$, 16.5–27 Al$_2$O$_3$, 0–3 B$_2$O$_3$, 3–10 Na$_2$O, 2–9 K$_2$O, 0–5 MgO, 9.5–24 CaO, 0.2–8 SrO, 0–13 BaO, 0–3 ZrO$_2$ and 5–15 Li$_2$O+Na$_2$O+k$_2$O.

20. A glass according to claim 19, wherein said glass has a CTE of 79°–88°×10$^{-7}$/° C.

21. A glass according to claim 20, wherein said glass has a strain point over 625° C.

22. A glass according to claim 13, wherein said glass consists essentially, as expressed in terms of weight percent on an oxide basis, of 42–59 SiO$_2$, 16.5–26 Al$_2$O$_3$, 0–2 B$_2$O$_3$, 3–9 Na$_2$O, 2–7 K$_2$O, 0–5 MgO, 9.5–24 CaO, 0.2–7 SrO, 0–8 BaO, 0–2 ZrO2, and 6–15 LiO$_2$+Na$_2$O+K$_2$O.

23. In a flat panel display device containing a flat, transparent glass substrate, the improvement comprising a glass in accordance with claim 12.

24. In a plasma display panel containing a flat, transparent glass substrate, the improvement comprising a glass in accordance with claim 12.

* * * * *